United States Patent [19]

Doswald

[11] 4,284,554
[45] Aug. 18, 1981

[54] MONOAZO COMPOUNDS HAVING A 6-(2'-N-ALKYLANILINO—4-CHLORO-1',3',5'-TRIAZINYL-6'-AMINO OR ALKYLAMINO)-1-HYDROXY-3-SULFONAPHTHALENE COUPLING COMPONENT RADICAL

[75] Inventor: Paul Doswald, Münchenstein, Switzerland

[73] Assignee: Sandoz Ltd., Basel, Switzerland

[21] Appl. No.: 970,348

[22] Filed: Dec. 18, 1978

[30] Foreign Application Priority Data

Dec. 23, 1977 [CH] Switzerland ................ 15955/77

[51] Int. Cl.$^3$ ............................................. C09B 29/00
[52] U.S. Cl. .................................................. 260/153
[58] Field of Search .......................................... 260/153

[56] References Cited

U.S. PATENT DOCUMENTS

| | | | |
|---|---|---|---|
| 2,873,269 | 2/1959 | Pasciatti | 260/153 |
| 3,351,578 | 11/1967 | Andrew et al. | 260/153 |
| 3,484,431 | 12/1969 | Schneider | 260/147 |
| 4,089,895 | 5/1978 | Jager | 260/153 |
| 4,115,378 | 9/1978 | Bien et al. | 260/153 |
| 4,145,340 | 3/1979 | Ridyard | 260/153 |

FOREIGN PATENT DOCUMENTS

| | | |
|---|---|---|
| 2264401 | 6/1973 | Fed. Rep. of Germany . |
| 1228404 | 8/1960 | France . |
| 49-104923 | 10/1974 | Japan . |
| 899376 | 6/1962 | United Kingdom . |
| 1456001 | 11/1976 | United Kingdom . |
| 2003910 | 3/1979 | United Kingdom . |
| 2003911 | 3/1979 | United Kingdom . |
| 2036778 | 7/1980 | United Kingdom . |

*Primary Examiner*—Arthur P. Demers
*Attorney, Agent, or Firm*—Gerald D. Sharkin; Richard E. Vila; Melvyn M. Kassenoff

[57] ABSTRACT

Compounds of the formula in which
D is where
$R_1$ is hydrogen, $(C_{1-4})$alkyl or $(C_{1-4})$alkoxy,
m and n are 1 or 2, and
p is 0 or 1, with the proviso that n+p is 2 or 3,
$R_2$ is hydrogen or $(C_{1-4})$alkyl,
$R_3$ is $(C_{1-4})$alkyl, and
Hal is fluorine, chlorine or bromine, and mixtures thereof, which compounds are in free acid or salt form, their production and use as reactive dyestuffs for hydroxy group-containing and amide group-containing organic substrates such as leather and textiles consisting of or comprising natural or synthetic polyamides (e.g., wool, silk and nylon) or natural or regenerated cellulose (e.g., cotton, viscose and spun rayon).

16 Claims, No Drawings

MONOAZO COMPOUNDS HAVING A 6-(2'-N-ALKYLANILINO--4-CHLORO-1',3',5'-TRIAZINYL-6'-AMINO OR ALKYLAMINO)-1-HYDROXY-3-SULFONAPHTHALENE COUPLING COMPONENT RADICAL

The present invention relates to azo compounds containing a fibre-reactive group, their production and use as reactive dyestuffs.

More particularly, the present invention provides compounds of formula I,

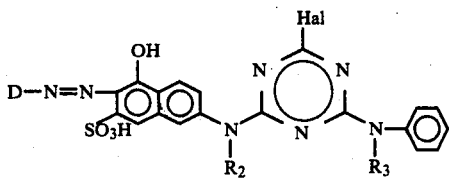

in which
D is a group of formula (a) or (b),

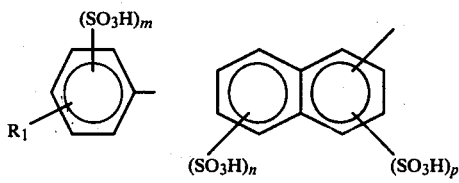

where
$R_1$ is hydrogen, $(C_{1-4})$alkyl or $(C_{1-4})$alkoxy,
m and n are 1 or 2, and
p is 0 or 1, with the proviso that n+p is 2 or 3,
$R_2$ is hydrogen $(C_{1-4})$alkyl,
$R_3$ is $(C_{1-4})$alkyl, and
Hal is fluorine, chlorine or bromine,
and mixtures thereof, which compounds are in free acid or salt form.

Any alkyl groups as $R_1$, $R_2$ and/or $R_3$ may be straight or branched, preferably straight chain. The preferred number of carbon atoms in such alkyl groups is 1 or 2. Any alkyl group as $R_1$ and/or $R_2$ is preferably methyl.

Any alkoxy group as $R_1$ is preferably straight chain and is preferably methoxy or ethoxy, especially methoxy.

$R_1$ is preferably $R_1'$, where $R_1'$ is hydrogen, methyl or methoxy. More preferably $R_1$ is $R_1''$, where $R_1''$ is hydrogen or methyl.

$R_2$ preferably $R_2'$, where $R_2'$ is hydrogen, methyl or ethyl. More preferably $R_2$ is $R_2''$, where $R_2''$ is hydrogen or methyl, especially hydrogen.

$R_3$ is preferably $R_3'$, where $R_3'$ is methyl or ethyl.
m is preferably 2.
n is preferably 2.
p is preferably 1.

When the group (a) is monosubstituted, the sulpho group may be in any position; where $R_1$ has a significance other than hydrogen and m is 1, the two substituents are preferably in the 2,5-positions. When m is 2 and $R_1$ is hydrogen the two sulpho groups are preferably in the 2,4- or 2,5-positions. When m is 2 and $R_1$ is other than hydrogen, the positions 2-$R_1$-4,6-disulpho or 4-$R_1$-2,5-disulpho are preferred, especially the latter.

When the group (b) bears two sulpho groups and the azo group is bound to the 1-position, the sulpho groups are preferably in the 3,6-, 3,8-; 4,6- or 4,8-positions, and when the azo group is bound to the 2-position, the sulpho groups are preferably in the 1,5-, 3,6-, 4,8-, 5,7- or 6,8-positions. When the radical (b) bears three sulpho groups they are preferably in the 3,6,8-positions with the azo group in the 1-position and in the 3,6,8-, 4,6,8- or 1,5,7-positions with the azo group in the 2-position.

Preferably the group (a) is (a₁),

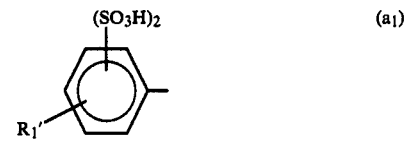

with the above-given preferred positions for the substituents.

The group (b) is preferably (b₁) or (b₂),

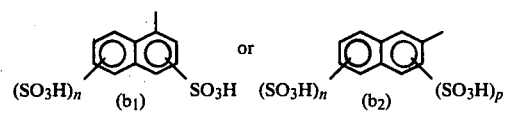

with the above-given preferred positions for the substituents.

More preferably the group (b) is (b₃),

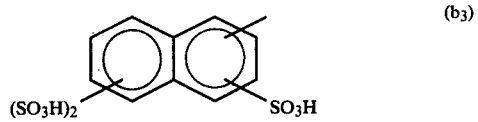

with the above-given preferred positions for the substituents. Most preferably (b) is (b₄),

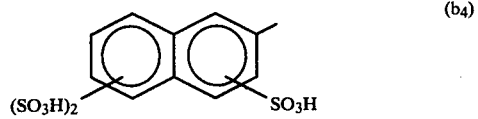

in which the sulpho groups are in the 3,6,8- or 4,6,8-positions.

Hal is preferably Hal₁, where Hal₁ is fluorine or chlorine, especially the latter.

Preferred compounds of formula I are:
(i) those where D is a group of formula (a₁), (b₁) or (b₂);
(ii) those wherein $R_2$ is $R_2'$ and $R_3$ is $R_3'$;
(iii) those of (i) or (ii) wherein Hal is Hal₁, especially chlorine;
(iv) those of (i), (ii) or (iii), wherein $R_2$ is $R_2''$, especially hydrogen;
(v) those of formula Ia,

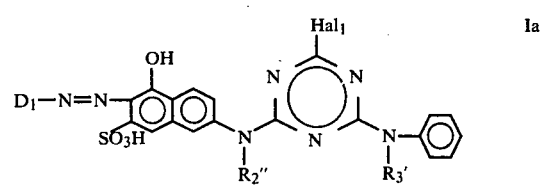

in which D₁ is a group of formula (a₁) or (b₃);

(vi) those of (v) wherein $D_1$ is a group of formula ($a_1$) wherein $R_1'$ is $R_1''$ or of formula ($b_4$), especially ($b_4$);

(vii) those of (v) wherein $Hal_1$ is chlorine;

(viii) those of (v) wherein $R_2''$ is hydrogen; and (ix) those of (vi) or (viii) wherein $Hal_1$ is chlorine;

which preferred compounds of groups (i) to (ix) are in free acid or salt form.

The cation of the salt form of the compounds of the present invention is not critical and may be any non-chromophoric cation conventionally contained in anionic dyestuffs.

As examples of suitable such cations may be given alkali metal cations and $N^{\oplus}(R_4)_4$ in which each $R_4$ independently is hydrogen, $(C_{1-4})$alkyl or 2-, 3- or 4-hydroxy$(C_{2-4})$alkyl. It will be appreciated that cations which are known to cause steric or stability problems, for example tetraalkanolammonium cations, are excluded. Specific examples of suitable cations are lithium, sodium, potassium, ammonium, mono-, di-, tri- and tetramethylammonium, triethylammonium, mono-, di- and tri-ethanolammonium and mono-, di- and triisopropanolammonium. Preferred cations are the alkali metal cations and ammonium, with sodium being most preferred.

The present invention further provides a process for the production of compounds of formula I comprising (a) reacting cyanuric halide with a compound of formula II,

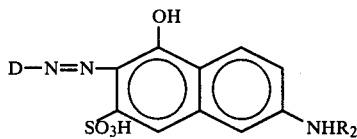

or a mixture thereof, which compound(s) are in free acid or salt form, and a compound of formula III

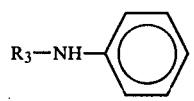

in any order or (b) coupling a diazotized amine of formula IV,

or a mixture thereof with a compound of formula V,

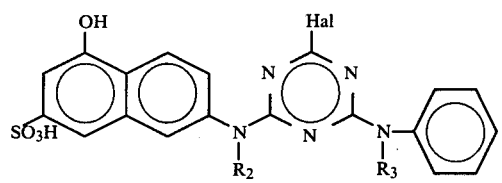

or a mixture thereof, which compound or mixture is in free acid or salt form.

The condensation reactions (a) may be carried out in accordance with known methods. Similarly, coupling and diazotizing may be effected in accordance with known methods.

The compounds of formulae II, III and IV are known. The compounds of formula V may be prepared in analogy with known methods from available starting materials.

The compounds of formula I may be isolated in accordance with known methods, for example by salting out, filtering and drying in a vacuum.

The compounds of formula I and mixtures thereof are useful as dyestuffs for dyeing and printing hydroxy group-containing or amide group-containing organic substrates. Preferred substrates are leather and textiles consisting of or comprising natural or synthetic polyamides such as wool, silk or nylon, natural or regenerated cellulose such as cotton, viscose of spun rayon.

Dyeing and printing may be carried out in accordance with conventional methods for reactive dyestuffs.

Those dyes in which $m=1$ or $n+p=2$ are especially suitable for dyeing by the exhaust method. The dyes wherein $m=2$ or $n+p=3$ are especially suitable for printing and are also suitable for use in padding processes.

The compounds of formula I and their mixtures give intense dyeings and exhibit notable build-up power and satisfactory fixation properties including a good fixation yield.

The dyeings and prints obtained exhibit notable light and wet fastnesses such as fastness to washing, sweat, chlorine and chlorine bleaching agents and are stable to the action of reducing agents.

In the case of the prints the contours are sharp. Also to be mentioned are the easy removal by washing of non-bound dyestuff and the stability of the printing pastes. In the case of padding, the solubility of the dyes of the invention and stability of the padding liquor containing the same is notable and the easy removal of non-bound dyestuff is a distinct advantage.

The following examples further serve to illustrate the present invention. In the Examples all parts are by weight and temperatures are in degrees Centigrade.

EXAMPLE 1

132 Parts of 1-amino-4-methylbenzene-2,5-disulphonic acid are stirred in 350 parts water and are adjusted to a pH of 9.0 with 120 parts of a 30% sodium hydroxide solution; the temperature of the solution rises to 47° C. 103 Parts of the sodium salt of naphthalene-2-sulphonic acid are added thereto, the solution is cooled with ice and subsequently diazotized at 0°-5° with 143 parts of a 4 N sodium nitrite solution. 136.7 Parts 6-N-acetylamino-1-hydroxynaphthalene-3-sulphonic acid dissolved in 450 parts water are added to the diazonium solution, coupling is carried out at pH 6-7 in the presence of 62 parts sodium carbonate. After the coupling is complete the dyestuff suspension is treated with 213 parts of a 30% sodium hydroxide solution for 1 to 2 hours at 90°-95° in order to split off the acetyl group. After adding 184 parts 30% hydrochloric acid, the dyestuff is salted out from the cooled reaction mixture by adding 250 parts sodium chloride. The obtained dyestuff of the formula

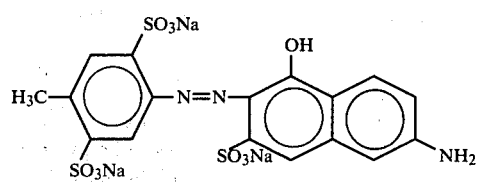

is dissolved in 1000 parts water. To the solution 85.5 parts cyanuric chloride suspended in 700 parts ice water are added, a temperature of 0°-5° is maintained and the pH is kept at 3.0 by adding 20.6 parts sodium carbonate. After 1½ to 2 hours condensation is complete, 52.3 parts N-methylaniline are added to the dyestuff, the temperature is raised to 55°-60° and the pH adjusted to 7.0-7.5 by adding 60 parts sodium carbonate. The reaction is complete in 2½ hours and the resulting dye is separated by adding 17 parts 30% hydrochloric acid and 390 parts sodium chloride. The dye of the formula

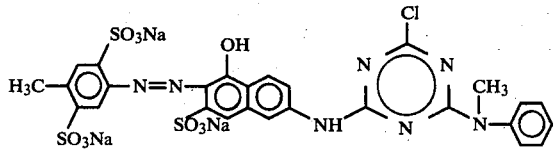

dissolves in water to give an orange-red solution and dyes cotton in pure orange shades. The dyeings and prints exhibit good light and wet fastnesses.

EXAMPLE 2

A diazo solution is prepared by dissolving 38.2 parts 2-aminonaphthalene-3,6,8-trisulphonic acid in 400 parts water and treating the same with 25 parts of 30% hydrochloric acid and diazotizing for 10 minutes at 0°-5° with 6.9 parts sodium nitrite dissolved in 24 parts water. Coupling is effected by adding this diazonium solution to 27.3 parts 6-N-acetylamino-1-hydroxynaphthalene-3-sulphonic acid in 90 parts water. During the coupling reaction the pH was set at 5-6 with sodium carbonate and the temperature was held at 8°-12°. After coupling the product was deacylated and separated in analogy with the procedure described in Example 1.

The paste is dissolved in 500 parts water and the pH is set at 6 with hydrochloric acid. 14.75 Parts cyanuric chloride are added portionwise at 15°-20° and the mixture is stirred for 3 hours. The pH is adjusted to 5-6 by the addition of a dilute sodium carbonate solution. After completion of the condensation the reaction mixture is diluted with 400 parts water. Subsequently, 8.6 parts N-methylanilene are added thereto and the mixture is heated to 35°-40° and stirred for 40 minutes, the pH being maintained at 6.5 to 7 by the addition of a dilute sodium carbonate solution. The dye which is subsequently isolated by adding sodium chloride is of the formula

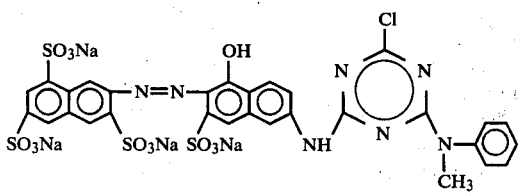

and is obtained as a dark red powder which dissolves in water to give a red solution and dyes and prints cotton in scarlet shades, the dyeings and prints having good light and wet fastnesses.

In analogy with the procedure described in Examples 1 and 2, further dyes as given in the following Table may be prepared. The dyes when prepared in analogy with the procedure of Examples 1 and 2 are obtained in sodium salt form. However, in accordance with conventional methods they may be isolated in free acid form or in another salt form. The dyes give prints and dyeings on cellulose fibres which are of the following shades:

yellow-orange—dyes of Examples 3 to 16, 13 to 17, 38 and 39;

orange—dyes of Examples 7 to 12, 24 and 34 to 37; and scarlet—dyes of Examples 18 to 23 and 25 to 33.

TABLE

| Example No. | D | $R_2$ | Hal | Amino Component III |
|---|---|---|---|---|
| 3 | 1-aminobenzene-2,5-disulphonic acid | H | Cl | N-methylaniline |
| 4 | 1-aminobenzene-2,5-disulphonic acid | H | F | " |
| 5 | 1-aminobenzene-2,5-disulphonic acid | H | Cl | N-ethylaniline |
| 6 | 1-aminobenzene-2,5-disulphonic acid | H | F | " |
| 7 | 1-amino-4-methyl-benzene-2,5-disulphonic acid | H | Cl | " |
| 8 | 1-amino-4-methyl-benzene-2,5-disulphonic acid | H | F | " |
| 9 | 1-amino-4-methyl-benzene-2,5-disulphonic acid | H | F | N-methylaniline |
| 10 | 1-amino-4-methyl-benzene-2,5-disulphonic acid | $CH_3$ | Cl | " |
| 11 | 1-amino-4-ethyl-benzene-2,5-disulphonic acid | H | Cl | " |
| 12 | 1-amino-4-ethyl-benzene-2,5-disulphonic acid | H | Cl | N-ethylaniline |
| 13 | 1-aminobenzene-2,4-disulphonic acid | H | Cl | " |
| 14 | 1-aminobenzene-2,4-disulphonic acid | H | Cl | N-methylaniline |
| 15 | 1-aminobenzene-2,4-disulphonic acid | $CH_3$ | Cl | " |
| 16 | 1-amino-2-methylbenzene-4,6-disulphonic acid | H | Cl | " |
| 17 | 1-amino-2-methylbenzene-4,6-disulphonic acid | H | Cl | N-ethylaniline |
| 18 | 2-aminonaphthalene-3,6,8-trisulphonic acid | H | Cl | " |
| 19 | 2-aminonaphthalene-3,6,8-trisulphonic acid | $CH_3$ | Cl | N-methylaniline |
| 20 | 2-aminonaphthalene-3,6,8-trisulphonic acid | H | F | " |
| 21 | 2-aminonaphthalene-4,6,8-trisulphonic acid | H | Cl | N-methylaniline |
| 22 | 2-aminonaphthalene-4,6,8-trisulphonic acid | H | Cl | N-ethylaniline |
| 23 | 2-aminonaphthalene-1,5,7-trisulphonic acid | H | Cl | " |
| 24 | 1-aminonaphthalene-3,6,8-trisulphonic acid | H | Cl | N-methylaniline |
| 25 | 2-aminonaphthalene-3,6-disulphonic acid | H | Cl | " |
| 26 | 2-aminonaphthalene-3,6-disulphonic acid | $CH_3$ | Cl | " |
| 27 | 2-aminonaphthalene-4,8-disulphonic acid | H | Cl | " |
| 28 | 2-aminonaphthalene-4,8-disulphonic acid | $CH_3$ | Cl | " |
| 29 | 2-aminonaphthalene-5,7-disulphonic acid | H | Cl | " |
| 30 | 2-aminonaphthalene-5,7-disulphonic acid | $CH_3$ | Cl | " |

TABLE-continued

| Example No. | D | $R_2$ | Hal | Amino Component III |
|---|---|---|---|---|
| 31 | 2-aminonaphthalene-5,7-disulphonic acid | H | F | " |
| 32 | 2-aminonaphthalene-5,7-disulphonic acid | $CH_3$ | F | " |
| 33 | 2-aminonaphthalene-5,7-disulphonic acid | H | Cl | N-ethylaniline |
| 34 | 1-aminonaphthalene-3,6-disulphonic acid | H | Cl | N-methylaniline |
| 35 | 1-aminonaphthalene-4,6-disulphonic acid | H | Cl | " |
| 36 | 1-aminonaphthalene-4,6-disulphonic acid | $CH_3$ | Cl | " |
| 37 | 1-aminonaphthalene-4,8-disulphonic acid | H | Cl | " |
| 38 | 1-aminobenzene-2-sulphonic acid | H | Cl | " |
| 39 | 1-aminobenzene-2-sulphonic acid | $CH_3$ | Cl | " |

APPLICATION EXAMPLE A

1 Part of the product of Example 31 is dissolved in 300 parts of water. 10 Parts of cotton are immersed in the solution and the temperature is raised to 40° over a period of 10 minutes. 15 Parts of Glauber's salt are then added, followed 30 minutes later by 3 parts of sodium carbonate. Dyeing is continued for 1 hour at 40°.

The dyed cotton is removed from the dyebath, rinsed in cold water followed by hot rinsing, and soaped for 20 minutes in a boiling solution containing 500 parts of water and 0.5 parts of sodium alkylsulphonate. After rinsing a scarlet dyeing with good fastnesses is obtained.

APPLICATION EXAMPLE B

In analogy with the procedure described in Example A, 1 part of the dye of Example 38 is used to dye cotton at 80° C. An orange dyeing with good fastness is obtained.

APPLICATION EXAMPLE C

2 Parts of the dye of Example 1 are dissolved in 100 parts warm (c. 40°) water to which 10 parts of urea have been added. 30 Parts of a 30% sodium carbonate solution and 0.5 parts 1-nitrobenzene-3-sulphonic acid sodium salt are added thereto. Spun rayon fabric is impregnated with this solution to a 75% weight increase. After drying, the fabric is treated for 5 to 10 minutes with wet steam at 102°, rinsed and soaped in a boiling solution for 15 minutes. After drying, an orange dyeing having good light and wet fastnesses is obtained.

APPLICATION EXAMPLE D

2 Parts of the dye of Example 3 and 20 parts of urea are dissolved in 50 parts of water at 20°. After the addition of 15 parts of 10% aqueous sodium carbonate solution, the volume of the solution is made up to 100 parts.

The solution is padded onto 20 parts of cotton fabric to an uptake of 80% of its dry weight, and the padded fabric is first dried and then steamed at 103° for 10 minutes. Finally the dyeing is rinsed, soaped in a boiling solution, rinsed again and dried to give a yellow-orange dyeing having good fastnesses.

APPLICATION EXAMPLE E

A printing paste consisting of

```
   25 parts  dyestuff of Example 1 or 2
  100 parts  urea
  440 parts  water
  400 parts  4% sodium alginate thickener
   10 parts  sodium salt of 1-nitrobenzene-3-sulphonic acid
   25 parts  sodium bicarbonate
 1000 parts
``` was applied to cotton fabric in accordance with a conventional printing method.

The printed material is dried and fixed in steam at 102°–104° for 4 to 8 minutes. The fabric is then rinsed in hot water, soaped in a boiling solution and dried. An orange (dye of Example 1) or scarlet (dye of Example 2) print with good light and wet fastnesses is obtained.

What is claimed is:

1. A compound of the formula $$D-N=N-\underset{SO_3H}{\underset{|}{\text{naphthol}}}-N(R_2)-\underset{N}{\underset{\parallel}{\text{triazine(Cl)}}}-N(R_3)-\text{phenyl}$$

or a salt thereof each cation of which is non-chromophoric, wherein

D is $$\underset{R_1}{\text{benzene}}(SO_3H)_m \quad \text{or} \quad \text{naphthalene}(SO_3H)_n(SO_3H)_p$$

wherein
$R_1$ is hydrogen, $C_{1-4}$alkyl or $C_{1-4}$alkoxy,
m is 1 or 2,
n is 1 or 2, and
p is 0 or 1,
with the proviso that $n+p$ is 2 or 3,
$R_2$ is hydrogen or $C_{1-4}$alkyl, and
$R_3$ is $C_{1-4}$alkyl,
or a mixture of such compounds in free acid or salt form.

2. A compound according to claim 1, or a salt thereof each cation of which is non-chromophoric.

3. A compound according to claim 2, or a salt thereof each cation of which is lithium, sodium, potassium or $N^{\oplus}(R_4)_4$, wherein each $R_4$ is independently hydrogen, $C_{1-4}$alkyl or 2-, 3- or 4-$C_{2-4}$hydroxyalkyl, with the proviso that at least one $R_4$ is hydrogen or $C_{1-4}$alkyl.

4. A lithium, sodium, potassium or ammonium salt according to claim 3.

5. A compound according to claim 2, or a salt thereof each cation of which is non-chromophoric, wherein $R_1$ is hydrogen, methyl or methoxy.

6. A compound according to claim 2, or a salt thereof each cation of which is non-chromophoric, wherein $R_2$ is hydrogen, methyl or ethyl.

7. A compound according to claim 2, or a salt thereof each cation of which is non-chromophoric, wherein $R_3$ is methyl or ethyl.

8. A compound according to claim 2, or a salt thereof each cation of which is non-chromophoric, wherein D is (i)

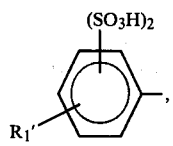

wherein $R_1'$ is hydrogen, methyl or methoxy, with the proviso that when $R_1'$ is hydrogen, the sulfo groups are in the 2,4- or 2,5-positions and when $R_1'$ is methyl or methoxy, $R_1'$ is in the 2-position and the sulfo groups are in the 4,6-positions or $R_1'$ is in the 4-position and the sulfo groups are in the 2,5-positions,

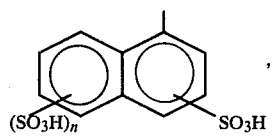

wherein n is 1 or 2, with the proviso that when n is 1 the sulfo groups are in the 3,6-, 3,8-, 4,6- or 4,8-positions and when n is 2 the sulfo groups are are in the 3,6,8-positions or

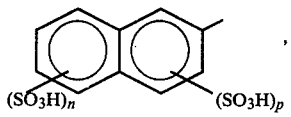

wherein n is 1 or 2, and p is 0 or 1, with the proviso that n+p is 2 or 3, and with the further proviso that when n is 1 and p is 1, the sulfo groups are the 1,5-, 3,6- or 4,8-positions, when n is 2 and p is 0, the sulfo groups are in the 5,7- or 6,8-positions, and when n is 2 and p is 1, the sulfo groups are in the 3,6,8-, 4,6,8- or 1,5,7-positions.

9. A compound according to claim 8, or a salt thereof each cation of which is non-chromophoric, wherein $R_2$ is hydrogen or methyl.

10. A compound according to claim 9, or a salt thereof each cation of which is non-chromophoric, wherein $R_2$ is hydrogen.

11. A compound according to claim 8 having the formula

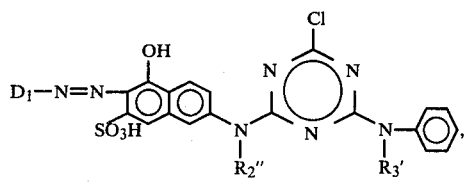

or a salt thereof each cation of which is non-chromophoric, wherein $D_1$ is (i)

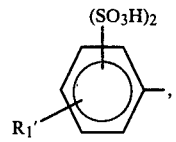

wherein $R_1'$ is hydrogen, methyl or methoxy, with the proviso that when $R_1'$ is hydrogen, the sulfo groups are in the 2,4- or 2,5-positions and when $R_1'$ is methyl or methoxy, $R_1'$ is in the 2-position and the sulfo groups are in the 4,6-positions or $R_1'$ is in the 4-position and the sulfo groups are in the 2,5-positions or

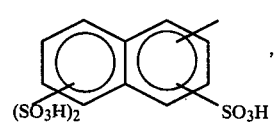

with the proviso that the sulfo groups are in the 3,6,8-positions when the azo radical is in the 1-position and in the 3,6,8-, 4,6,8- or 1,5,7-positions when the azo radical is in the 2-position, $R_2''$ is hydrogen or methyl, and $R_3'$ is methyl or ethyl.

12. The compound according to claim 11 having the formula

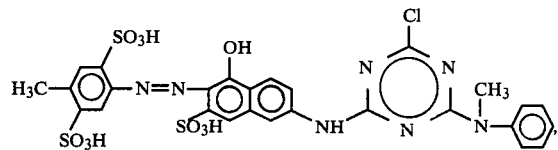

or a salt thereof each cation of which is non-chromophoric.

13. The compound according to claim 11 having the formula

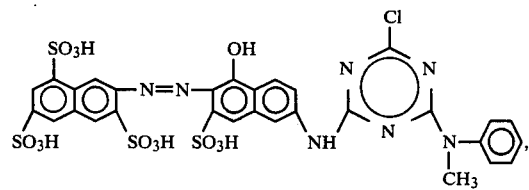

or a salt thereof each cation of which is non-chromophoric.

14. The compound according to claim 11 having the formula

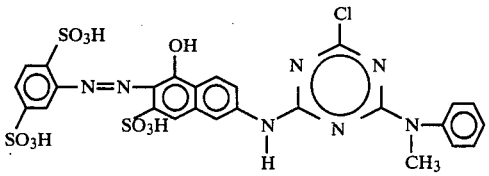

or a salt thereof each cation of which is non-chromophoric.

15. The compound according to claim 7 having the formula
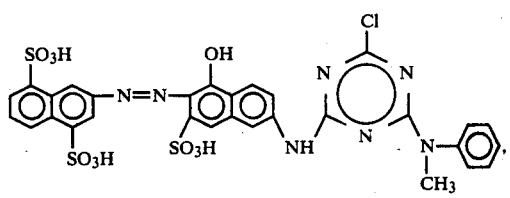
or a salt thereof each cation of which is non-chromophoric.
16. The compound according to claim 7 having the formula
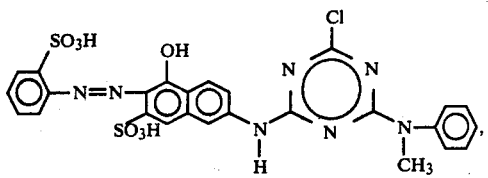
or a salt thereof each cation of which is non-chromophoric.
* * * * *